March 22, 1927.
I. SEDGWICK
1,621,856
THREE-WHEELED TRACTOR
Filed Nov. 20, 1922    2 Sheets-Sheet 1
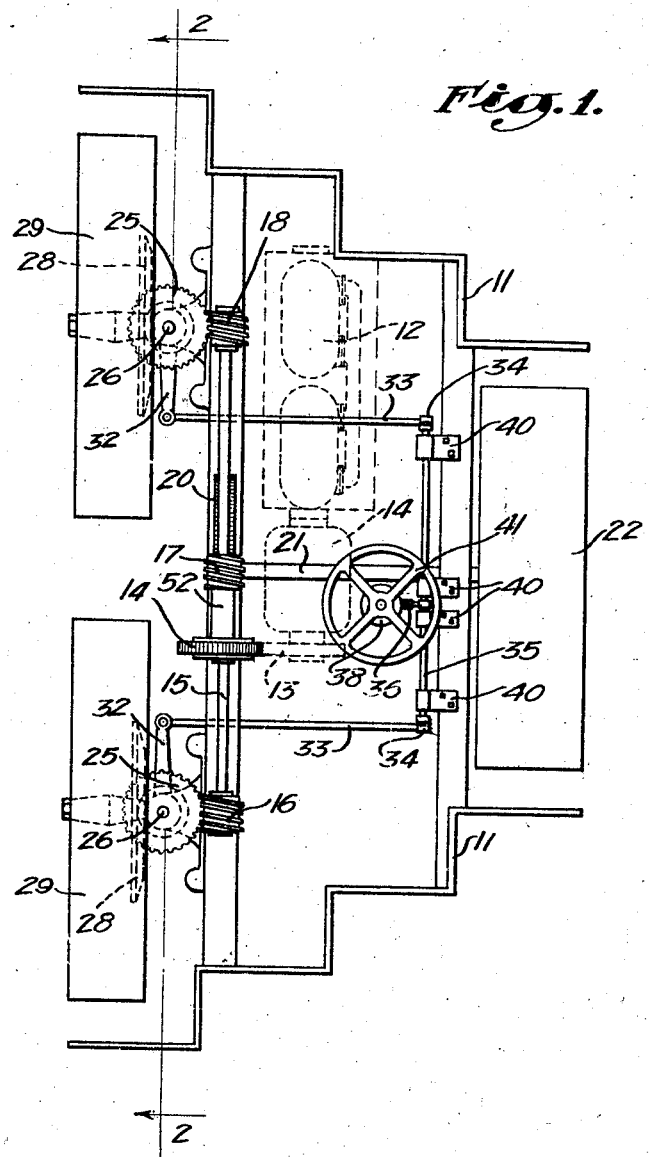
INVENTOR:
ISHAM SEDGWICK,
BY
Graham Harris
ATTORNEYS

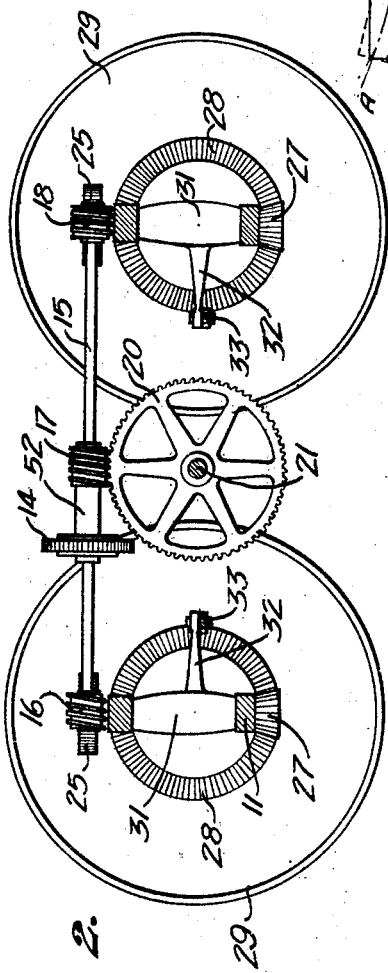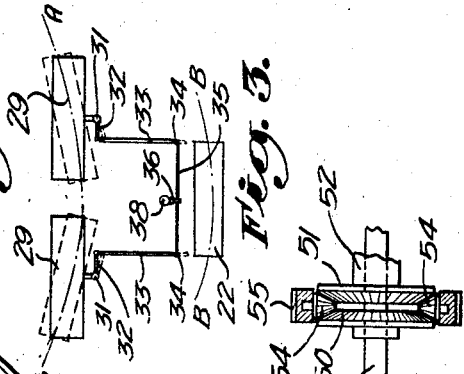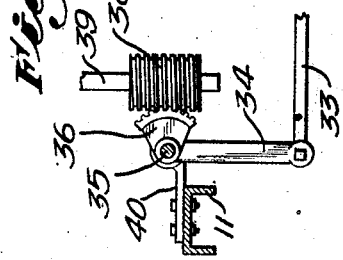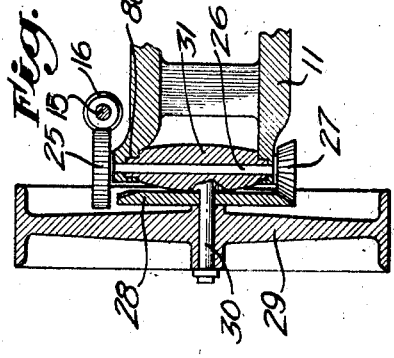

Patented Mar. 22, 1927.

1,621,856

UNITED STATES PATENT OFFICE.

ISHAM SEDGWICK, OF RIVERSIDE, CALIFORNIA.

THREE-WHEELED TRACTOR.

Application filed November 20, 1922. Serial No. 602,159.

This invention relates to tractors and particularly to farm tractors which are employed for various haulage purposes and is particularly adapted to ground cultivation. This application is a continuation-in-part of my application on a triple drive tractor plow, Serial No. 406,016, filed August 25, 1920 and my Patent No. 1,436,409, dated Nov. 21, 1922.

An object of my invention is to provide a tractor having a frame on one side of which is secured a central wheel and on the other side of which is secured two tandem wheels which are mounted on vertical axis so that they may be turned to change the course of the tractor.

A further object is to provide means in such a tractor for driving all three wheels.

A further object is to provide means by which the driver of the tractor may turn the tandem wheels about said vertical axis so that they run on a single circular track and thus turn the tractor.

Further objects and advantages will be made evident hereinafter.

The invention resides in the novel combination and arrangement of parts shown in the drawings and described more in detail hereinafter.

Referring to the drawings which are for illustrative purposes only,

Fig. 1 is a plan view of a preferred form of my invention.

Fig. 2 is a section taken upon a plane represented by the line 2—2 of Fig. 1.

Fig. 3 is an enlarged detail of the differential gear.

Fig. 4 is a section through one of the wheels.

Fig. 5 is an enlarged detail showing the worm gear and gear segment included in the steering means.

Fig. 6 is a diagram showing the turning mechanism of the vehicle.

In the embodiment of my invention shown in the drawings a frame 11 is provided in which an engine 12 is secured, this engine driving a gear 13 through a transmission 14 containing a clutch in accordance with standard practice. The gear 13 drives a differential gear 14 which is connected to a drive shaft 15 and a worm gear 17 which is free to turn on the shaft 15. The drive shaft 15 carries two worm gears 16 and 18. The worm gear 17 drives a gear 20 secured to a fixed axle 21 on which a central wheel 22 is secured. The worms 16 and 18 drive worm wheels 25 which are secured to a pivot shaft 26 which is free to turn in the frame 11, as shown in Fig. 4, which carries at its lower end a bevel pinion 27 which in turn drives a bevel gear 28 secured to the tandem wheel 29.

There are two tandem wheels 29 located as shown in Fig. 1, each of these wheels turning on a stub shaft 30 which is secured to a member 31 which is free to turn, in a bearing 80 in the frame 11, about the pivot shaft 26. Each of the members 31 is provided with an arm 32 to which is pivoted a bar 33 having the other end thereof attached to a crank 34 which is mounted upon a shaft 35 which passes through the bearings 40. The two cranks 34 are located at the extreme ends of the shaft 35. Near the central part of the shaft 35 is mounted a gear segment 36 which is engaged by a worm 38 mounted upon a shaft 39, as best shown in the enlarged detail in Fig. 5. The shaft 39 may be rotated by means of a hand wheel 41.

The tractor may be turned by operating the hand wheel 41 which in turn rotates the worm 38, rotating the gear segment 36, thus turning the shaft 35 and swinging the cranks 34. Each crank 34 transmits movement to a bar 33 which connects to an arm 32 of each hub 31. The arms 32 are attached upon adjacent sides of the hubs 31, thus extending towards each other. Owing to the fact that the cranks 34 both extend downwardly from the longitudinal shaft 35, they swing in the same direction when the steering wheel 41 is revolved, with the result that the arms 32 are both swung in the same inward or outward direction, as indicated in Fig. 6, thus causing the tandem wheels to assume positions tangential to the arc of curvature A—A. The single wheel 22, being disposed upon an axis extending intermediately between the tandem wheels, will follow an arc B—B which is concentric with the arc A—A.

The tractor may be driven in either direction by suitable changes in the transmission 14 through the drive gear, the tandem wheels 29 and the central wheel 22 being driven in the same direction.

My invention provides a differential gear 14, which is shown in enlarged detail in Fig. 3. The differential gear 14 includes two bevel gears 50 and 51, the gear 50 being attached to the shaft 15 and the gear 51 being attached to a sleeve 52 which is turnably mounted on the shaft 15. Upon the other end of the sleeve 52 is the worm 17, not shown in Fig. 3, which engages the worm wheel 20 which drives the central wheel 22. The bevel gears 50 and 51 engage pinions 54 which are pinned to the inside of a ring gear 55. The gear 55 may be suitably driven by the transmission gear 13.

I claim as my invention:

1. In a triple drive tractor, the combination of: a frame; a single wheel on one side of said frame; a pair of tandem wheels on the other side of said frame; a longitudinal shaft for driving said pair of tandem wheels; gears at the ends of said longitudinal shaft through which power may be transmitted to said tandem wheels; a lateral shaft for driving said single wheel; an engine mounted in said frame; and means for differentially driving said longitudinal and said lateral shafts from said engine, said driving means including: a gear on said lateral shaft, a sleeve on said longitudinal shaft, means on said sleeve for rotating said gear on said lateral shaft, and a differential having one major gear thereof mounted upon said sleeve and the other major gear mounted upon said longitudinal shaft.

2. In a triple drive tractor, the combination of: a frame; a single wheel on one side of said frame; a pair of tandem wheels on the other side of said frame; a longitudinal shaft for driving said pair of tandem wheels; gears at the ends of said longitudinal shaft through which power may be transmitted to said tandem wheels; a lateral shaft for driving said single wheel; an engine mounted in said frame; a gear on said lateral shaft; a sleeve on said longitudinal shaft; means on said sleeve for rotating said gear on said lateral shaft; a differential having one major gear thereof mounted upon said sleeve and the other major gear mounted upon said longitudinal shaft; a spindle for mounting each of said tandem wheels; a fork for pivotally supporting each of said spindles on a substantially vertical axis; a ring gear concentrically mounted upon each tandem wheel; a pinion for driving each of said ring gears, said pinions being respectively rotatable upon the said vertical axes upon which said spindles are pivoted; a worm wheel mounted with each of said pinions; and a worm mounted upon each end of said longitudinal shaft for driving said worm wheels mounted with said pinions which drive said ring gears.

3. In a triple drive tractor, the combination of: a frame; a single wheel on one side of said frame; a pair of tandem wheels on the other side of said frame; a longitudinal shaft for driving said pair of tandem wheels; gears at the ends of said longitudinal shafts through which power may be transmitted to said tandem wheels; a lateral shaft for driving said single wheel; an engine mounted in said frame; a sleeve disposed about said longitudinal shaft; gear means connecting said sleeve to rotate with said lateral shaft; and means for differentially rotating said longitudinal shaft and said sleeve by power from said engine.

In testimony whereof, I have hereunto set my hand at Los Angeles, California, this 13th day of November 1922.

ISHAM SEDGWICK.